United States Patent [19]
Remmerfelt

[11] Patent Number: 5,112,066
[45] Date of Patent: May 12, 1992

[54] RESILIENT SEALING RING

[76] Inventor: Arne Remmerfelt, Vintergatan 42, S-541 33 Skövde, Sweden

[21] Appl. No.: 622,722

[22] Filed: Dec. 5, 1990

[51] Int. Cl.$^5$ ............................................. F16J 15/00
[52] U.S. Cl. ................................ 277/236; 277/235 B; 123/193.4
[58] Field of Search ............... 277/236, 235 B, 188 R; 285/917, 379, 349; 123/193 CH, 193 R, 193 CP

[56] References Cited

U.S. PATENT DOCUMENTS

| | | | |
|---|---|---|---|
| 3,080,171 | 3/1963 | Booth | 277/236 |
| 3,367,682 | 2/1968 | Meriano | 277/236 |
| 3,661,135 | 5/1972 | Weiss | 123/193 CH |
| 3,762,388 | 10/1973 | Tamulenas | 123/193 CH |
| 4,474,147 | 10/1984 | Hoopes | 277/235 B |
| 4,505,290 | 3/1985 | Scobie | 277/236 |
| 4,513,978 | 4/1985 | Nicholson | 123/193 CH |
| 4,813,692 | 3/1989 | Halling et al. | 277/200 |

FOREIGN PATENT DOCUMENTS 1196252  6/1970  United Kingdom ................ 277/236

Primary Examiner—William A. Cuchlinski, Jr.
Assistant Examiner—D. Depumpo
Attorney, Agent, or Firm—Cohen, Pontani, Lieberman & Pavane

[57] ABSTRACT

A sealing ring for sealing against fluid leakage between mainly planar surfaces of a pair of parts that are mounted in forced relation against each other. The ring comprises, in an exemplary form, a resilient member having a radially oriented annular section, and first and second ends projecting generally in opposite axial directions, respectively, from radially inner and radially outer portions of the annular section. The first end includes a first member projecting generally axially from the annular section, a second member projecting generally radially outwardly from the first member, and a third member projecting generally axially towards the annular member, such that the first, second and third members collectively have a generally U-shaped cross-section. Radially outer surfaces of the first end and of the third member of the second end comprise sealing surfaces; and a pair of axially opposite surfaces of the annular section comprises generally parallel surfaces for sealing against the pair of parts that are mounted in a forced relation against each other.

15 Claims, 1 Drawing Sheet

RESILIENT SEALING RING

BACKGROUND AND SUMMARY OF THE INVENTION

The present invention relates to a ring for sealing against fluid leakage (e.g. of gas or liquid) between two parts having mainly planar surfaces that are forced against each other. More particularly, the invention relates to the foregoing sealing ring for use where the two parts to be sealed comprise a cylinder block and cylinder head of an engine that operates at high pressure and high temperature, such as a combustion engine.

As a consequence of developing modern combustion engines, especially diesel engines, to achieve higher efficiency and power per liter of cylinder capacity, the pressure and temperature in the cylinders are increased. This results in major problems of sealing between cylinder block (e.g. a cylinder lining) and cylinder head.

Many different ways of solving the foregoing problem have been tried. For example, packings of hard or soft materials have been tried, as well as various shapes for the sealing surfaces. Also resilient sealing means of particular form have been tried.

The most common method of sealing multicylinder engines is to obtain, in the production process, the highest possible flatness of the mating sealing surfaces and to press, with high bolt forces, the two surfaces against the centerlines of the cylinders' perpendicular surfaces, with or without a packing in between. This means, however, that certain deformations of the surfaces may occur merely due to non-uniform static forces. During running, additional non-uniform forces result from pulsating gas forces caused by combustion pressure, and forces caused by temperature variations.

After a passage of sufficient time, other shape changes or exhaustion occur in the material, and as a consequence leakage of gas or liquid may occur.

Further drawbacks reside in the large number of hefty bolts and the large bolt forces required, which increase the dimensions of the affected parts, resulting in higher weight, and limiting the possibilities of achieving optimal technical solutions for flow and combustion.

The foregoing deficiencies are remedied or reduced by the present invention, which in one form, comprises a sealing ring for sealing against fluid leakage between mainly planar surfaces of a pair of parts that are mounted in forced relationship against each other. The ring, which is resilient, has a radially oriented annular section, and first and second ends projecting generally in opposite axial directions, respectively, from radially inner and radially outer portions of the annular section. The second end includes a first member projecting generally axially from the annular section, a second member projecting generally radially outwardly from the first member, and a third member projecting generally axially towards the annular member, such that the first, second and third members have a generally U-shaped cross-section. Radially outer surfaces of the first end and of the third member of the second end comprise sealing surfaces. Further, a pair of axially opposite surfaces of the annular section comprise generally parallel sealing surfaces.

A corresponding form of the invention also comprises a sealing ring for sealing against fluid leakage between mainly planar surfaces of a pair of parts that are mounted in forced relationship against each other. The ring, which is resilient, has a radially oriented annular section, and first and second ends projecting generally in opposite axial directions, respectively, from radially outer and radially inner portions of the annular section. The second end includes a first member projecting generally axially from the annular section, a second member projecting generally radially inwardly from the first member, and a third member projecting generally axially towards the annular member, such that the first, second and third members collectively have a generally U-shaped cross-section. Radially inner surfaces of the first end and of the third member of the second end comprise sealing surfaces. Further, a pair of axially opposite surfaces of the annular section comprises generally parallel sealing surfaces.

The recited radially outer or radially inner sealing surfaces are generally of cylindrical or conical shape. Such sealing surfaces are thus generally perpendicular to the mainly planar surfaces of the pair of parts that are mounted in forced relation against each other, such parts typically being the cylinder head and cylinder block of an engine. This means that the sealing surfaces of the ring and corresponding surfaces of the cylinder block and head, respectively, are minimally affected by the bolt and gas forces. Deformations, if any, are accounted for by the resilience of the ring, since the sealing forces are free to move with respect to each other.

BRIEF DESCRIPTION OF THE DRAWING FIGURES

Other objects and advantages of the present invention will become apparent from reading the following detailed description of the preferred embodiments of the invention, in connection with the accompanying drawing, in which like numbers refer to like parts, and in which each figure is a cross-section through a cylinder of a combustion engine along a cylinder axis:

DETAILED DESCRIPTION OF THE PRESENTLY PREFERRED EMBODIMENT

The accompanying drawing shows in principle three different embodiments, where a resilient ring of steel, for example, has at least two sealing surfaces, one to seal against a cylinder head, and one to seal against a portion of a cylinder block such a cylinder lining.

Figure 1:
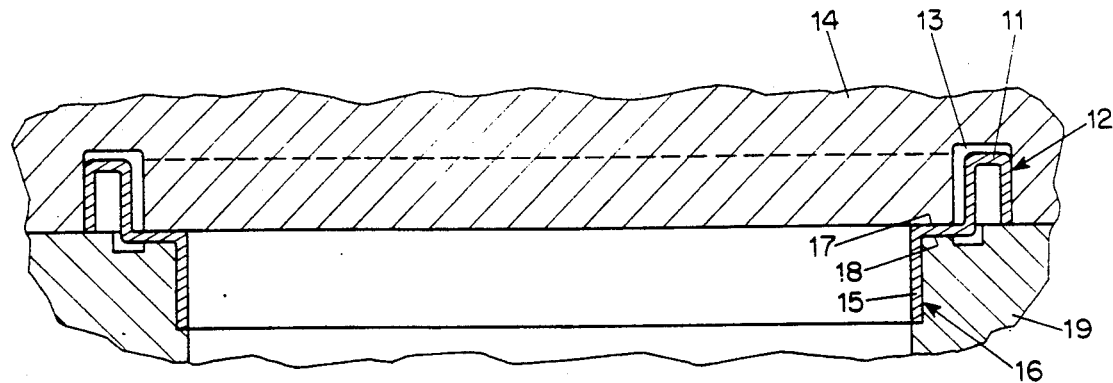
FIG. 1 shows an embodiment where a resilient ring has a U-shaped part for insertion into a groove in a cylinder head, and a cylindrical part for sealing against an inside of the cylinder.

The embodiment shown in FIG. 1 is so designed that the cross-section of a ring has a U-shaped part 11 with a carefully formed sealing surface on the outside 12, which is pressed into a corresponding groove 13 in the cylinder head 14.

A cylindrical part 15 of the ring, diagonally opposite the U-shaped part, is pressed into a recess in a cylinder lining or other portion of the cylinder block 19. The sealing surface 16 is carefully worked in order to provide a fully satisfactory seal.

The ring is so shaped that it is firmly anchored by the surfaces 17 and 18.

Figure 2:
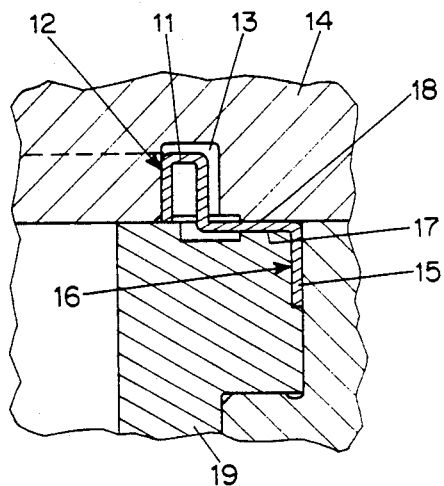
FIG. 2 shows an embodiment that is adapted to so-called wet cylinder linings in which a resilient ring has a U-shaped part for insertion in a groove in a cylinder head, and a cylindrical part for sealing against the outside of a cylindrical lining, e.g. a lining collar.

The embodiment shown in FIG. 2 is adapted for so-called loose or wet cylinder linings. The sealing ring has a U-shaped part 11 with a carefully worked sealing surface on the inside 12, part 11 being pressed into a corresponding groove 13 in the cylinder head 14. A cylindrical part 15, diagonally opposite the U-shaped part 11, is pressed into a recess in the outside of a cylindrical lining or other portion 19 of a cylinder block.

Sealing surfaces against gas pressure are situated beside the cylindrical part 16, also at the planar surfaces 17 and 18, between which surfaces the ring is firmly enclosed.

Figure 3:
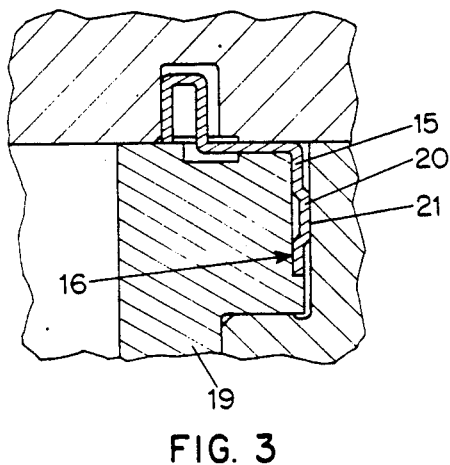
FIGS. 3 and 4 are similar to FIG. 2 but show additional modifications to the embodiments of FIGS. 1 and 2.

The cross-section of the cylindrical part 15 may be designed with a curved part 21 as shown in FIG. 3, whereby, in addition to sealing against gas pressure, liquid sealing is also obtained. In the FIG. 3 embodiment, the ring is resiliently mounted against a curved diameter of the cylinder block or, where present, a corresponding free diameter in a recess for a lining collar of a cylinder block. In this embodiment, surfaces 16 and 21 both constitute sealing surfaces.

Figure 4:
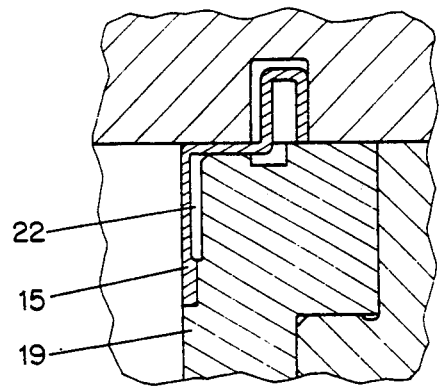

FIG. 4 shows the embodiment of FIG. 1 modified to have a heat shield 22 between the ring and the upper part of the cylinder wall 19. The FIG. 4 embodiment is primarily intended for engines having so-called wet cylinder linings. Because (i) heat conduction away from the upper part of the cylinder lining (i.e. the so-called lining collar) is thereby limited, (ii) the cylinder is not an integrated part of the cylinder block and (iii) there is a greater mass of parts in this area, the temperature during running is considerably higher in the vicinity of heat shield 22 than in adjacent parts. In the long run, this can be a drawback for the sealing arrangement in the vicinity of the lining. However, by forming heat shield 22 with a larger or smaller gap between the cylindrical part 15 of the sealing ring and the cylinder lining, the hot combustion gases are barred from direct contact with the cylinder wall.

In all of the foregoing embodiments, the parts of the ring that seal against corresponding parts of a cylinder block and cylinder head are so dimensioned that, within the span of normal temperature variation, there is always a tight fit, with sufficient tension.

In order to avoid damage to the sealing surfaces upon assembly, and to remove possible surface defects, the sealing means is given a treatment by phosphating or coating with a soft metal such as lead, tin or zinc.

When forming the respective sealing grooves in the cylinder block and cylinder head, great care is preferably exercised to obtain good concentricity between the sealing surfaces. This is especially so for engines where a single cylinder head is common to several cylinders. The present invention, however, beneficially allows for a certain eccentricity within the tolerances currently applied in the industry. Currently known and used production methods are satisfactory to obtain sufficient accuracy.

All of the foregoing embodiments of the ring can be produced by pressing or deep drawing, by being machined from tube blanks, or by being bent from a profile into a ring the ends of which are butt welded. The resilient properties are obtained by proper selection of material and suitable heat treatment according to known technology.

It should be understood that the preferred embodiments and examples described are for illustrative purposes only and are not to be construed as limiting the scope of the present invention which is properly delineated only in the appended claims.

What is claimed is:

1. A sealing ring for sealing against fluid leakage between mainly planar surfaces of a pair of parts that are mounted in forced relation against each other, said ring comprising:

a resilient member having a radially projecting annular section comprising a pair of axially opposite surfaces and first and second ends projecting generally in opposite axial directions, respectively, from radially inner and radially outer portions of said annular section, said first end having a radially outer surface; and said second end comprising a first member projecting generally axially from said annular section, a second member projecting generally radially outwardly from said first member, and a third member projecting from said second member generally axially towards said annular member, said third member having a radially outer surface, such that said first, second and third members collectively have a generally U-shaped cross section, whereby said radially outer surfaces of said first end and of said third member of said second end comprise sealing surfaces and said pair of surfaces of said annular member comprise generally parallel sealing surfaces.

2. The sealing ring of claim 1, wherein said resilient member comprises steel.

3. The sealing ring of claim 1, wherein a portion of said first end includes a relief on a radially outwardly facing surface for separating said portion from an adjacent one of the pair of parts that are mounted in forced relation against each other.

4. The sealing device of claim 1, wherein the pair of parts comprises:

a portion of a cylinder block of a combustion engine to which said first end of said ring seals; and a cylinder head of a combustion engine including an axially extending groove into which said second end of said ring projects to seal against a wall of the groove.

5. The sealing device of claim 1, in combination with said pair of parts that are mounted in forced relation against each other.

6. The sealing device of claim 4, in combination with said portion of said cylinder block and said cylinder head.

7. A sealing ring for sealing against fluid leakage between mainly planar surfaces of a pair of parts that are mounted in forced relation against each other, said ring comprising:

a resilient member having a radially oriented annular section comprising a pair of axially opposite surfaces and first and second ends projecting generally in opposite axial directions, respectively, from radially outer and radially inner portions of the annular section, said first end having a radially inner surface; and said second end comprising a first member projecting generally axially from said annular section, a second member projecting generally radially inwardly from said first member, and a third member projecting from said second member generally axially towards said annular member, said third member having a radially outer surface, such that said first, second and third members collectively have a generally U-shaped cross section, whereby said radially inner surfaces of said first end and of said third member of said second end comprise sealing surfaces and said pair of surfaces of said annular section comprise generally parallel sealing surfaces.

8. The sealing device of claim 7, wherein said ring comprises steel.

9. The sealing device of claim 7, wherein:
said first end of said ring includes an intermediate curved portion extending in a radial direction and being resilient; and
both radially inner and radially outer surfaces of said first end comprise respective sealing surfaces.

10. The sealing device of claim 7, wherein the pair of parts comprises:
a portion of a cylinder block of a combustion engine to which said first end of said ring seals; and
a cylinder head of a combustion engine including an axially extending groove into which said second end of said ring projects to seal against a wall of the groove.

11. The sealing device of claim 7, in combination with said pair of parts that are mounted in force relation against each other.

12. The sealing device of claim 10, in combination with said portion of said cylinder block and said cylinder head.

13. A sealing ring for sealing against fluid leakage between mainly planar surfaces of a pair of parts that are mounted in forced relation against each other, said ring comprising:
a resilient member having a radially projecting annular section comprising a pair of axially opposite surfaces and first and second ends projecting generally in opposite axial directions, respectively, said first end having a radial surface; and
said second end comprising a first member projecting generally axially from said annular section, a second member projecting generally radially from said first member, and a third member projecting from said second member generally axially towards said annular member, said third member comprising a radial surface, such that said first, second and third members collectively have a U-shaped cross section, said radial surface of said first end and of said third member of said second end being on the same side in the radial direction as the projection of said second member, whereby said radial surface of said first end and of said third member of said second end comprise sealing surfaces and said pair of surfaces of said annular member comprise generally parallel sealing surfaces.

14. The sealing ring of claim 13, wherein said first and second ends project in generally opposite directions, respectively, from radially inner and radially outer portions of the annular section;
said second member projects generally radially outward from the first member; and
radially outer surfaces of the first end and of the third member of the second end comprising sealing surfaces.

15. The sealing ring of claim 13, wherein said first and second ends project generally opposite axial directions, respectively, from radially outer and radially inner portions of the annular section
said second member projects generally radially inward form the first member; and
radially inner surfaces of the first end and of the third member of the second and end and comprise sealing surfaces.

* * * * *